United States Patent

[11] 3,583,325

| [72] | Inventor | Thomas N. Melin |
| | | Longview, Wash. |
| [21] | Appl. No. | 843,443 |
| [22] | Filed | July 22, 1969 |
| [45] | Patented | June 8, 1971 |
| [73] | Assignee | Swing Shift Mfg. Co. |
| | | Rainier, Oreg. |

[54] PASSENGER CONVEYOR SYSTEM
32 Claims, 11 Drawing Figs.

[52] U.S. Cl............................................ 104/25,
198/16 MS, 198/185, 198/184
[51] Int. Cl........................................B65g 15/06,
B65g 47/34
[50] Field of Search.................................. 104/25;
198/181, 185, 187, 195, 193, 194, 85, 16 MS, 16;
308/DIG. 7; 74/232

[56] References Cited
UNITED STATES PATENTS

| 2,908,506 | 10/1959 | Runton................ | 308/DIG. 7 |
| 2,973,084 | 2/1961 | Sinden................. | 198/16 MS |
| 3,011,221 | 12/1961 | Howell................. | 74/232 |
| 3,104,755 | 9/1963 | Zuercher.............. | 198/185 |
| 3,106,991 | 10/1963 | Winge.................. | 308/DIG. 7 |
| 3,179,238 | 4/1965 | Patin................... | 198/181 |
| 3,314,517 | 4/1967 | Karr..................... | 198/16 |

FOREIGN PATENTS

| 80,050 | 5/1918 | Austria................ | 198/185 |

*Primary Examiner*—Arthur L. La Point
*Assistant Examiner*—D. W. Keen
*Attorney*—Christie, Parker & Hale ABSTRACT: A passenger conveyor system having a single endless conveyor belt for moving passengers in opposite directions. Horizontal guide pulleys are located at the ends of each line of conveyor travel, and a rotary-driven drum is mounted in an underground pit between each end pair of guide pulleys. The conveyor belt has a low-friction reverse surface mounted on a low-friction supporting surface which extends between the ends of the conveyor. The conveyor belt is looped around each rotary drum so that its upper high-friction tread surface engages the drums, thereby enabling the belt to be driven effectively. An upright, vertically oriented rotary drum overlaps the end of each conveyor to urge passengers to move laterally from the belt before it enters the pit and to prevent objects from jamming the belt drive system.

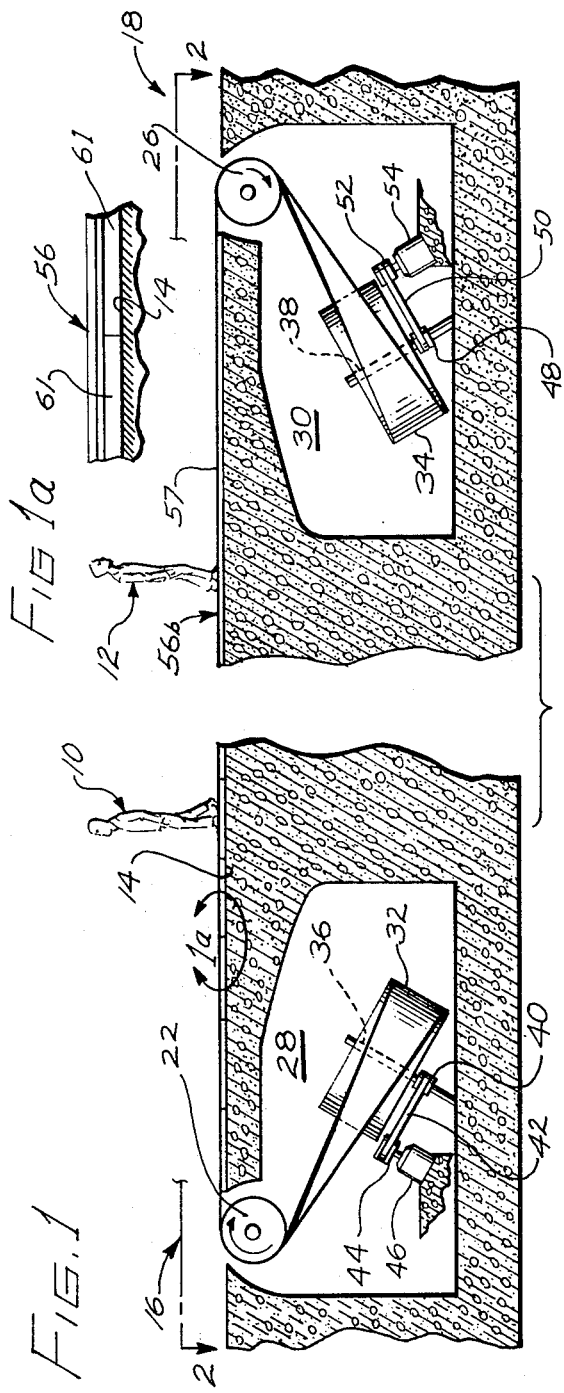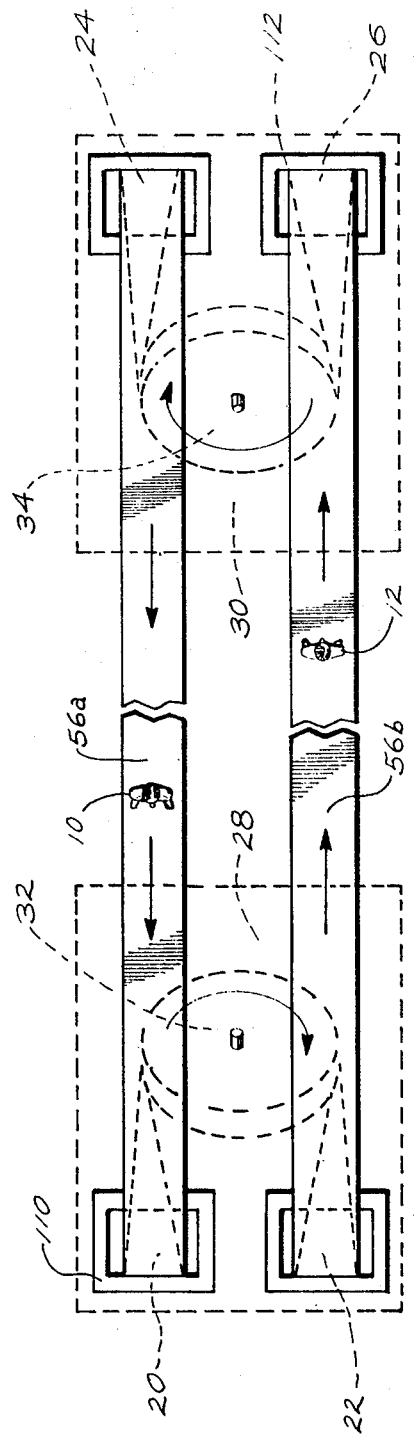
INVENTOR.
THOMAS N. MELIN

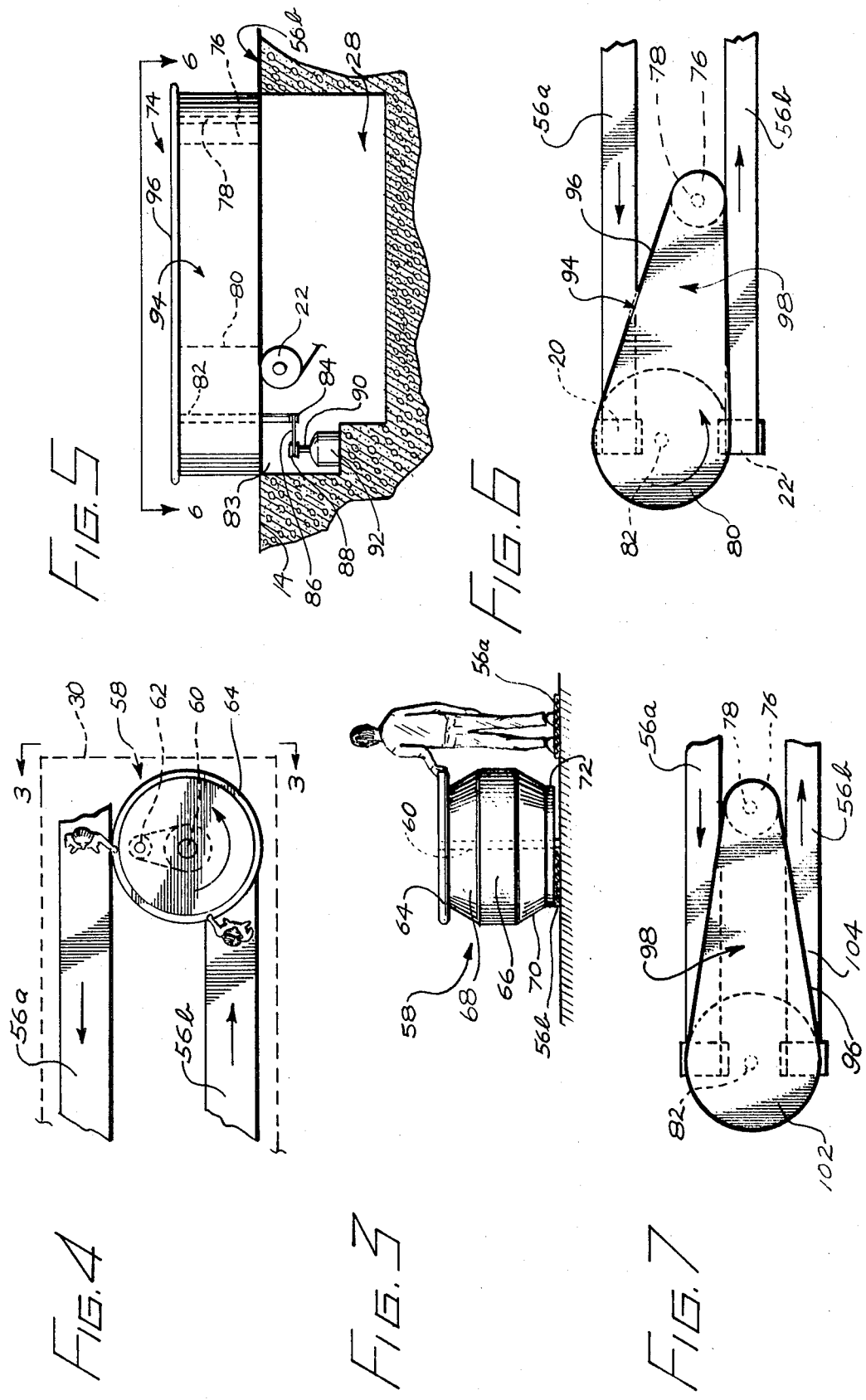

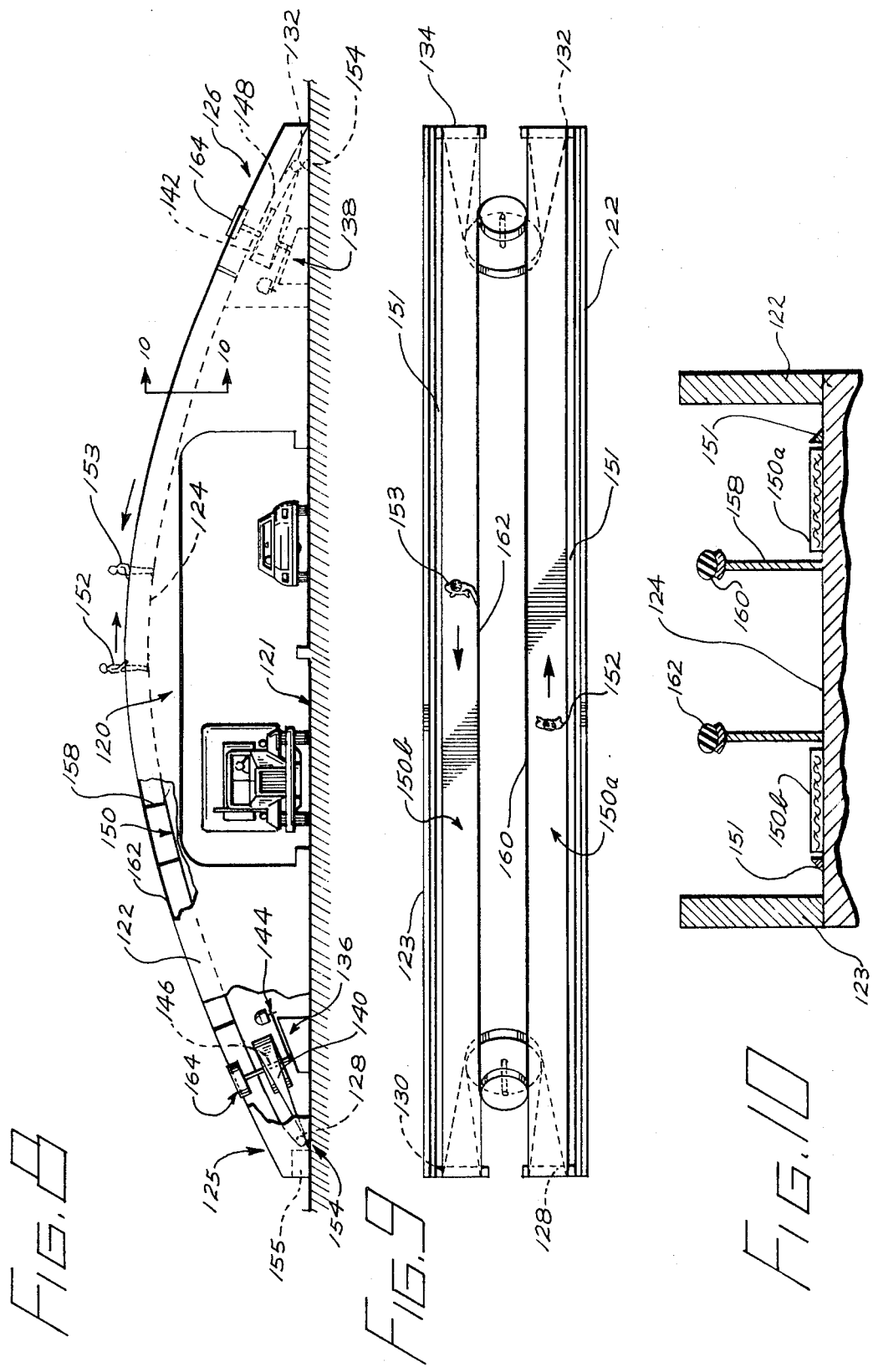

PASSENGER CONVEYOR SYSTEM

BACKGROUND OF THE INVENTION

1. Field of the Invention

This invention relates to "moving sidewalks" for transporting passengers.

2. Description of the Prior Art

Moving sidewalks generally comprise an endless rubber belt driven by horizontal drums at each end of a desired line of passenger travel. Each drum and its drive mechanism are typically located at the end of a longitudinal trench which provides underground space for the return path of the conveyor belt and belt support rollers. In the past, accidents and other serious problems arising from the use of moving rubber belt sidewalks have adversely affected public and insurance underwriter acceptance and consequent commercial success of moving sidewalks. For example, passengers' feet, articles of clothing, or small objects often pass through or are pinched in the space between the tread surface of the conveyor belt and the stationary passenger landing scraper bar at the end of the conveyor. As a result, passengers may be injured, the drive mechanism at the end of the conveyor is jammed, or the conveyor belt is frayed or shredded. Most improvements in moving belt sidewalks have been directed toward developing safety landings for passengers, grooved belts and mating combs, and systems for automatically stopping the conveyor when an object jams the conveyor belt. These improvements have tended to be relatively complicated devices which substantially increase the cost of the overall passenger conveyor system. Besides safety of travel, production costs and the speed and comfort with which passengers are conveyed also affect the commercial success of moving sidewalks. However, because of the understandable high costs for developing passenger safety devices, relatively few improvements in moving sidewalks have been directed toward the development of conveyor systems having lower production costs, and greater comfort and safety for passengers.

SUMMARY OF THE INVENTION

This invention provides an improved passenger conveyor system having a conveyor belt arrangement which permits substantially lower manufacturing costs than those of conventional moving sidewalks, while providing greater comfort for passengers. Furthermore, a safety device is provided at the terminals of the conveyor for urging departing passengers laterally from the conveyor belt so that they avoid contact with the end of the conveyor. The safety device also substantially prevents small objects passing through the space at the end of the conveyor from jamming the conveyor belt drive mechanism and from damaging the belt.

Generally speaking, this invention contemplates a passenger conveyor system having a single endless belt adapted to provide transport for passengers in opposite, preferably horizontal, directions. The conveyor system defines two-spaced terminal stations between which passengers are conveyed. A rotary drum is located at each terminal station. Guide means, preferably entrance and exit belt guide pulleys, are disposed upstream and downstream, respectively, of the rotary drum at each terminal station. The guide means preferably are disposed on opposite sides of the rotary drum's axis of rotation. The guide means at each terminal station are substantially coaxially aligned. The above-mentioned endless conveyor belt has an upper tread surface for support of passengers. The upper surface of the belt is engaged with at least one of the rotary drums, and drive means rotate said one drum to drive the conveyor belt relative to the terminal stations.

In the preferred form of the invention the belt at each terminal station is successively engaged with an entrance guide pulley, a rotary drum, and an exit guide pulley. At each station, the guide pulleys and the rotary drum are arranged so that the belt's upper tread surface is engaged with the periphery of the rotary drum and so that, between the terminal stations, the belt tread surface faces upwardly for support of passengers using the system. Between the stations, the belt provides oppositely moving passenger support surfaces.

In the preferred form of the invention, the drums, pulleys, and drive mechanisms for the drums are disposed in a subsurface housing at each end of the conveyor. The reverse surface of the belt preferably is defined of a low-friction material such as nylon, "Teflon," i.e., tetrafluroethylene, or a related material. The reverse surface of the belt is mounted on a low-friction longitudinal support surface extending between the ends of the conveyor. Preferably, "Teflon" or low-friction coated plates may be mounted on the support surface.

The conveyor system of this invention provides a substantial reduction in the cost of a moving belt sidewalk because it used one conveyor belt instead of two for transporting passengers in two directions, and it eliminates the longitudinal trough or trench typically used for the return path of conveyor belts in conventional moving sidewalks. Improved passenger comfort is provided because passengers ride on a solid-supporting surface instead of a belt supported by closely spaced-apart idler pulleys under the belt conveyor. This eliminates the uncomfortable pulsing action which often accompanies conventional moving sidewalks. Relatively thick conveyor belts are used in typical moving sidewalks to improve the comfort of the ride. The present invention allows thinner belts to be used because the longitudinal trough and the intermediate supporting pulleys are eliminated, thereby effecting a further savings in production costs.

This invention additionally includes upright barrier means traversing the conveyor belt for encouraging passengers to move laterally from the belt just adjacent to and upstream of each terminal station. The barrier means are adapted to provide a moving upright barrier surface which traverses the conveyor in a fixed line of travel having a component of movement in the conveyor's direction of travel. Passengers are thereby urged to move laterally from the conveyor when approaching the barrier surface. In a preferred form of the invention, the barrier means comprises an upright revolving terminal drum disposed adjacent the conveyor belt so that it overlaps the end section of the belt, thereby preventing passenger contact with the potentially most dangerous part of the conveyor. Preferably, the drum comprises a substantially horizontal upper handrail, and intermediate revolving section adapted to support the handrail, and a lower revolving foot section constructed of a flexible material which provides a resilient contacting surface for passengers' feet. The drum is adapted to be driven at a speed greater than that of the conveyor belt; preferably, the foot section of the drum is driven at a speed greater than that of the intermediate section and upper handrail to rapidly spin off people's feet in the event of occasional contact with passengers' shoes or the like. A substantial portion of the intermediate revolving section is greater in diameter than the lower revolving section, so that passengers happening to come into contact with the drum will normally avoid contacting the faster-moving lower foot section. The bottom edge of the foot section is preferably located in close proximity to the upper tread surface of the conveyor belt to prevent objects from travelling under the terminal drum and into the conveyor drive mechanism. The upright terminal drum overlaps the exit end of each run of the conveyor belt, so that objects will not be carried under the terminal drum, do not jam the drive mechanism, or shred the conveyor belt.

In an alternate preferred form of the invention, the barrier means includes a first upright rotating terminal drum adjacent the conveyor belt, and a second rotary terminal drum downstream of the first drum. An upright endless belt engages the terminal drums, and the drums are arranged so that the upright belt traverses the conveyor belt, at least adjacent the exit end of a run thereof, skew to its direction of travel while being driven in a downstream direction with the belt. Preferably, the terminal drums are positioned relatively far apart so that the upright belt crosses the conveyor belt at a gradual angle to afford the passengers substantial time to move laterally from the conveyor. Thus, passengers happening to come in contact with the upright belt mechanism as they approach a terminal station do not contact a stationary object. Instead, their feet are gradually urged laterally off of the conveyor belt without injury. A flexible handrail is secured to the upper edge of the upright belt to assist passengers alighting from the conveyor. In one preferred form of this further embodiment, the upright belt traverses a substantial portion of the width of the conveyor belt, while the second upright drum substantially overlaps the end of the conveyor belt. Further, the lower edge of the upright belt is in close proximity to the upper tread surface of the conveyor belt so that objects are prevented from travelling under the upright belt, and are gently moved laterally off the conveyor belt.

BRIEF DESCRIPTION OF THE DRAWINGS

The above-mentioned and other features of the invention are more fully set forth in the following detailed explanation of several preferred embodiments of the invention, such description being presented with reference to the accompanying drawings, wherein:

FIG. 1 is a fragmentary elevational view of the passenger conveyor system of this invention;

FIG. 1A is an enlarged detail view of a portion of the structure shown in FIG. 1;

FIG. 2 is a fragmentary elevational plan view taken on line 2-2 of FIG. 1;

FIG. 3 is a side elevational view of the upright revolving terminal drum of this invention;

FIG. 4 is a plan elevational view of the upright terminal drum, the relation of FIG. 3 to the illustration of FIG. 4 being shown by line 3-3 of FIG. 4;

FIG. 5 is a side elevational view of the upright terminal belt mechanism of this invention;

FIG. 6 is a plan elevational view taken on line 6-6 of FIG. 5;

FIG. 7 is a plan elevational view of another upright terminal belt mechanism of this invention;

FIG. 8 shows a side elevational view of an alternative use of the conveyor system of this invention;

FIG. 9 is a plan elevational view of the conveyor system of FIG. 8; and

FIG. 10 is a view taken on line 10-10 of FIG. 8.

DESCRIPTION OF THE PREFERRED EMBODIMENTS

Referring to the drawings, a passenger conveyor system 9 provides means for transporting passengers 10 and 12 along a flat horizontal surface 14 which extends between a left terminal station 16 and a right terminal station 18.

A pair of horizontal belt guide pulleys 20 and 22 are laterally spaced-apart and coaxially aligned with one another at the left end of the passenger conveyor system. A similar pair of horizontal belt guide pulleys 24 and 26 are laterally spaced-apart and coaxially aligned with one another at the right end of the conveyor. The guide pulleys are arranged so that pulley 20 is aligned with pulley 24 longitudinally of the conveyor, and pulley 22 is similarly aligned with pulley 26. A pit 28 is formed in surface 14 at left terminal station 16 and a similar pit 30 is provided at right terminal station 18. The guide pulleys are mounted for rotation in the upper part of their respective pits such that the upper peripheral surfaces of the pulleys are tangential to horizontal surface 14. Preferably, pulleys 20 and 22 are located at the end of pit 28 opposite from pit 30, and similarly with pulleys 24 and 26 relative to pit 28. The several guide pulleys are each as long along their axes of rotation as the width of belt 56, described below.

A right circularly cylindrical rotatable belt drive drum having a width along its axis of rotation approximately equal to he width of the adjacent guide pulleys is disposed within the lower part of underground pit 28 below guide pulleys 20 and 22. A similar left rotatable drum 34 is disposed within the lower part of pit 30 below pulleys 24 and 26. Each drum preferably is located forward of its respective guide pulleys, i.e., toward the opposite pit from the adjacent guide pulleys, and is mounted for rotation about an axis inclined from the vertical toward the opposite pit when viewed from the side. Left drum 32 rotates about an elongated, centrally disposed left drive shaft 36 which extends down and to the left from drum 32, and a similar right drive shaft 38 extends down and to the right from right drum 34. A sprocket wheel 40 is secured to the lower part of left drive shaft 36 and is engaged with an endless chain 42 which is coupled to a sprocket wheel 44 driven by a rotary drive motor 46 located in the bottom of pit 28. Similarly, the drive mechanism for right drum 34 includes a sprocket wheel 48 secured to the lower part of right drive shaft 38 and engaged with an endless chain 50 coupled to a sprocket wheel 52 driven by a rotary drive motor 54 located in the bottom of pit 30. Preferably, the drive mechanisms for drums 32 and 34 are identical and motors 46 and 54 preferably are synchronous motors so the drive drums have equal peripheral velocities.

An endless conveyor belt 56, having a resilient upper tread and traction surface 57 for passengers, is mounted on horizontal surface 14 and engaged with guide pulleys and rotatable drums 32 and 34 such that it simultaneously transports passengers in opposite directions between terminal stations 16 and 18 in response to rotation of the drums. Preferably, the belt is constructed of a nylon web material with a rubber surface. Belt thickness is approximately three-sixteenth inch, and the reverse surface 59 of the belt is preferably coated with a low-friction surfacing material such as tetrafluoroethylene. Preferably, similarly coated plates 61 (see FIG. 1A) are mounted on horizontal surface 14 for cooperation with the low-friction reverse surface of the belt to reduce the power required to drive the belt in use.

At left terminal 16 the reverse surface of the belt engages guide pulley 20 as the belt approaches drive drum 32; pulley 20 is sometimes referred to herein as the entrance guide pulley of station 16, and guide pulley 26 is the entrance guide pulley of station 18. The belt extends down into underground pit 28 from pulley 20 where it is twisted slightly (i.e., about one-quarter turn about its length) so that its high-friction upper tread is engaged with the outer surface of left belt drive drum 32. The belt then extends upward to the opposite side of the pit and is twisted one-quarter turn in the opposite direction about its length so that its reverse surface engages guide pulley 22, the exit guide pulley of terminal station 16. In similar fashion, the reverse surface of conveyor belt 56 engages the entrance guide pulley 26 at station 18 from which it extends down into underground pit 30. Between pulley 26 and drum 34 the belt is twisted one-quarter turn about its length so that its tread surface contacts rotary drum 34. The belt then extends upward to the opposite side of the pit and is twisted a like amount in the opposite direction so that its reverse surface engages exit guide pulley 24. The resilient upper tread surface of the conveyor belt produces a substantial driving traction with the outer surface of the drums as they rotate, thereby enabling the belt to be driven quite efficiently during operation of the conveyor system, if desired, the peripheral surfaces of the drive drums may be textured or serrated to provide additional traction with the obverse surface of the belt and to reduce slippage between the belt and the drums. The drums' angles of inclination are set and the guide pulleys are arranged relative to the drums to provide the maximum amount of contact between the belt and the drums. The drums preferably are sized so that their diameters are slightly larger than the lateral distance between the adjacent guide pulleys. This enables the belt to make a wrap of at least 180° around the outer peripheral surfaces of the drums so that a substantial amount of contact is produced between the cooperating surfaces of the belt and drums to enable the belt to be driven efficiently.

In use, drive motors 46 and 54 are driven so as to rotate drums 32 and 34 in a clockwise direction as indicated by the arrows in FIGS. 1 and 2. The section or run of the belt between guide pulleys 20 and 24 defines a longitudinal line of conveyor travel 56a from right terminal station 18 to left terminal station 16, and the run of the belt extending between guide pulleys 22 and 26 defines a longitudinal line of conveyor travel 56b from left terminal station 16 to right terminal station 18. Drive motors 46 and 54 may be reversed for rotating drums 32 and 34 in a counterclockwise direction when it is desired to move passengers in directions opposed to those shown in FIGS. 1 and 2. The cooperating low-friction surfaces of the belt and plates 61 provide a self-lubricating action which enables the belt to be driven efficiently along horizontal surface 14. The long horizontal trough of conventional moving sidewalks is eliminated by this conveyor system, and as a result, production costs are decreased and passenger comfort is enhanced. For example, in conventional moving sidewalks the conveyor belt is normally supported by closely spaced idler pulleys disposed along the length of the belt and extending transverse to the length of the belt. Since the belts of prior moving sidewalks are alternately supported and unsupported during the passenger's travel, the passenger typically experiences a pulsing or jerking sensation during his ride. This problem can be substantially eliminated in conventional moving sidewalks, but not without great expense. This problem is entirely avoided by this invention because the belt between the terminal stations is supported only on a solid longitudinal supporting surface.

It will be understood that the belt drive system shown in FIGS. 1 and 2 may be operated using one of drums 32 and 34 as conveyor drive means, while the other drum is used as an idler, if a sufficiently large drive motor and drive drum is provided. In such a case, the drum which functions as an idler may be substantially smaller in diameter than the other driven drum. Furthermore, it will be understood that each guide pulley may be replaced with equivalent guide means, such as a stationary curved end surface or shoe, for example. Stationary guide means of this nature would preferably include a support surface constructed of a low-friction material such as nylon or "Teflon" for cooperation with the low-friction reverse surface of the conveyor belt.

To provide safe and convenient access and egress to and from belt runs 56a and 56b, this invention provides an upright revolving drum 58 at each of the terminal stations of conveyor system 9 so that passengers avoid contact with the ends of the conveyor belt transport runs. FIGS. 3 and 4 show drum 58 disposed between adjacent runs of conveyor travel 56a and 56b at terminal station 18. At this station, drum 58 is adapted to overlap the exit end of conveyor belt run 56b so that a portion of the vertical exterior surface of the drum traverses the width of the conveyor as shown in FIG. 4; the opposite side of the drum is essentially in line with the near edge of conveyor run 56a. Drum 58 rotates about an elongated, vertically disposed drive shaft 60 driven by a rotary drive motor 62 located in right underground pit 30. Drive motor 62 is adapted to rotate drum 58 in a clockwise direction, as indicated by the arrows in FIGS. 3 and 4, so that the drum's vertical exterior surface adjacent belt run 56b moves in the same direction as the belt defining such run, and similarly with run 56a. Thus, drum 58 presents an upright barrier to passengers travelling downstream along belt run 56b, and the passengers approaching station 18 are encouraged to move laterally from the belt before the belt passes over guide pulley 26 to drive drum 34. If a passenger happens to come into contact with drum 58, the drum's exterior surface moves with the passenger to urge the passenger laterally off the conveyor in a direction away from belt run 56a.

As shown, drum 58 includes an upper handrail wheel 64 having a rim preferably constructed of a flexible material such as rubber. The handrail wheel is supported by the upper end of a relatively large intermediate drum section 66 having inwardly tapered upper and lower portions 68 and 70. A relatively narrow, resilient foot section 72 is disposed below drum section 66 in close proximity to the upper tread surface of conveyor belt 56. Foot section 72 preferably is constructed of rubber, and is adapted to rotate independently of intermediate section 66 and handrail wheel 64. Preferably, the foot section of drum 58 revolves at a rate producing a peripheral velocity thereof equal to about twice the speed of advance of the conveyor belt, and the intermediate section and the handrail wheel have peripheral speeds about 50 percent greater than the conveyor belt speed. In the event passengers' feet contact the resilient foot section, they are rapidly urged laterally from drum 58 and the conveyor belt without injury. However, passenger contact with the foot section is normally avoided because intermediate section 66 presents a substantially larger contacting surface than foot section 72. Handrail wheel 64 is located just above waist level for an average sized adult user of the conveyor system.

Drum 58 is additionally adapted to assist boarding passengers onto conveyor belt section 56a which travels away from terminal station 18. The drum is preferably mounted between conveyor belt runs 56a and 56b so that the extreme outer edge of handrail wheel 64 passes adjacent the inner longitudinal edge of section 56a. Thus, passengers are assisted onto belt section 56a by grasping handrail 64 which revolves in a downstream direction with belt section 56a.

It will be understood that the structure shown in FIGS. 3 and 4 preferably is provided in the vicinity of pit 28 as well as at pit 30 as shown.

FIGS. 5 and 6 show another arrangement for encouraging departing passengers to move laterally from the conveyor belt in advance of the locations where the belt moves down into pits 28 and 30. An upright endless belt mechanism 74 is adapted to be mounted at each of the terminal stations of conveyor system 9; FIGS. 5 and 6 show belt mechanism 74 mounted at left terminal station 16 above underground pit 28. Preferably, the belt mechanism includes an upright idler drum 76 disposed between belt sections 56a and 56b forward of terminal station 16. Drum 76 has an axis of rotation substantially normal to horizontal surface 14, and is adapted to rotate about an elongated vertically disposed shaft 78. An upright rotary belt drive drum 80, having a diameter substantially greater than that of drum 76 is located at terminal station 18 downstream of idler drum 76 along belt run 56a. Preferably, drum 80 is mounted rearwardly of horizontal guide pulleys 20 and 22 for belt 56 about a center of rotation offset from the center of drum 76 with reference to a line between the drive drums for conveyor belt 56. Drum 80 is configured and arranged so that it fully overlaps the end of belt run 56a at guide pulley 20 while its extreme outer vertical edge surface adjacent belt section 56b is substantially tangential to a leftward extension of the inner longitudinal edge of belt run 56b. Likewise, the extreme outer edge surface of drum 76 is substantially tangential to the inner edge of belt run 56b and such drum, disposed between the belt runs, has a diameter less than the distance between the belt runs. Drum 80 is mounted on an elongated vertically disposed drive shaft 82 which extends down into a leftward extension 83 of left underground pit 28. A sprocket wheel 84 is connected to the end of drive shaft 82 and is engaged with an endless chain 86 which in turn is engaged with a drive sprocket wheel 88 mounted on the shaft 90 of a rotary drive motor 92 located near the bottom of pit 28.

A vertically oriented endless belt 94, having a width slightly greater than the waist height of an average size adult, is engaged with drums 76 and 80; the upper edges of these drums substantially coincide with the upper edge of the belt, but the upper edge of the belt preferably is located above the drums to prevent damage to the hands of persons using the conveyor system. Since drum 80 is larger than drum 76 and fully overlaps the end of belt run 56a, vertical belt 94 traverses belt section 56a in an oblique path with reference to the belt's direction of travel. Drive motor 92 is adapted to drive drum 80, and therefore belt 94, in a counterclockwise direction as seen in FIG. 6. Thus, the section of belt 94 which traverses belt run 56a moves in the same direction as passengers travelling on belt run 56a. As the passengers approach belt mechanism 74, they are encouraged to move laterally from conveyor belt run 56a onto surface 14 thereby avoiding contact with the end of the belt run where it passes over guide pulley 20 into pit 28. Drums 76 and 80 preferably are spaced a relatively substantial distance apart along the length of the conveyor system so that belt 94 traverses conveyor belt run 56a at gradual angle to afford passengers sufficient time to move laterally from the conveyor. A flexible handrail 96 is secured to the upper edge of belt 94 to assist passengers alighting from the conveyor, and a flat horizontal cover plate 98 below but adjacent to the handrail covers the space bounded by vertical belt 94. The handrail may be formed integral with belt 94 if desired. The return path of belt 94, which travels in the same direction as conveyor belt run 56b, parallels the inner longitudinal edge of belt run 56b to assist passengers boarding the conveyor. Preferably, belt 94 travels at a lineal speed approximately 50 percent greater than that of conveyor belt 56.

FIG. 7 shows another entrance and exit assisting belt mechanism 98 wherein an upright idler drum 100 is disposed between conveyor belt runs 56a and 56b forward of a relatively large upright rotary driven drum 102 located at terminal station 16. The centers of rotation of the drums are substantially longitudinally aligned with a line between the drive drums for belt 56. Drum 102 has a diameter greater than the distance between the outer edges of belt runs 56a and 56b and is so positioned relative to belt guide pulleys 20 and 22 that it overlaps both the exit end of belt section 56a and the entrance end of belt section 56b. Thus, an upright endless belt 104 which engages the drums traverses both runs of the conveyor belt in paths skew to their directions of travel. Belt 104 is driven in a counterclockwise direction by an arrangement similar to that shown in FIG. 5 so that passengers approaching terminal station 16 are encouraged to move laterally from conveyor belt run 56a before belt 56 passes over guide pulley 20. This arrangement also provides assistance to persons boarding belt run 56b.

A small clearance, preferably on the order of approximately one-fourth inch, is provided between the upper tread of conveyor belt 56 and the bottom edge of foot section 72 (FIG. 3) and vertical belt 94 (FIGS. 5 and 6) or belt 104 (FIG. 7). Since the barrier means described above are adapted to overlap at least the exit end of the conveyor runs, objects carried by the belt and exceeding about one-fourth inch in height are prevented from passing under drum 58 or belts 94 or 104 and into the clearance between the passenger tread of belt 56 and the portions of surface 14 which define the openings 110 and 112 (see FIG. 2) in which entrance guide pulleys 20 and 26 of stations 16 and 18 are disposed. Since the barrier means of this invention encourage passengers to move laterally from the conveyor before the belt enters the pit at each terminal station, a clearance greater than one-fourth inch is permitted between the tread of the conveyor belt and the adjacent edges of openings 110 and 112; such clearance is considerably greater than that permissible in conventional moving sidewalks. A problem with presently known moving sidewalks is that a small object, such as a pencil or piece of clothing can pass into the small clearance at the end of the conveyor and jam the drive mechanism or shread the belt, and for this reason combs or doctor bars are provided at the exit ends of such moving sidewalks to prevent such objects from entering and jamming the small clearance spaces. In at least one instance a child fell on an existing moving sidewalk adjacent the exit end thereof, became caught between the belt surface and the doctor bar, and was horribly mangled before the device could be stopped. In the present invention, the barrier means overlap the exit ends of the conveyor runs to prevent passengers from proceeding to the ultimate end of the conveyor run, and thus accidents of the type described cannot occur. If a small object does happen to pass under the barrier means and into the space at the end of the conveyor, the conveyor drive mechanism is not jammed and the transport belt is not torn because the clearance at the end of the conveyor is greater than the clearance between the lower edge of the barrier means and the upper tread of the conveyor belt. Thus, the barrier means ensure trouble-free operation of the conveyor belt system, and act as safety devices by preventing passenger contact with the potentially dangerous ends of the conveyor belt.

Use of the conveyor system of this invention is not restricted to the transportation of passengers along a flat horizontal surface. As shown in FIGS. 8—10, the present conveyor system is adaptable for use in transporting passengers across arched overpass 120 which crosses a horizontal road surface 121, for example. The overpass includes vertical outer retaining walls 122 and 123, and an arcuate, transversely horizontal supporting surface 124 which extends between a left terminal station 125 and a right terminal station 126 on opposite sides of road 121. A pair of rollerlike belt guide pulleys 128 and 130 are disposed at terminal station 124 and a similar cooperating pair of rollerlike belt guide pulleys 132 and 134 are disposed at terminal station 126. Pulley 128 is aligned with pulley 132 longitudinally of the conveyor, and pulley 130 is similarly aligned with pulley 134. The pulleys are mounted for rotation about horizontal axes disposed at the opposite ends of support surface 124 a short distance above ground level laterally outwardly of the overpass.

An enclosed chamber 136 is located inside the overpass structure at left terminal station 124, and a similar chamber 138 formed in the overpass adjacent right terminal station 126. A left circularly cylindrical rotatable belt drive drum 140 is mounted in chamber 136, and a similar rotatable belt drive drum 142 is mounted in chamber 138. Each drum preferably is located midway between and forward of its respective guide pulleys, i.e., toward the opposite chamber from the adjacent guide pulleys. The drive drums are mounted for rotation about axes inclined from the vertical away from the opposite chamber when viewed from the side. The drums preferably are driven by identical synchronous drive motors 144 coupled to left drum drive shaft 146 and right drum drive shaft 148.

An endless conveyor belt 150, preferably constructed to be similar to above-described conveyor belt 56, is mounted on arcuate surface 124 and is engaged with the guide pulleys and belt drive drums such that it simultaneously transports passengers 152 and 153 in opposite directions between terminal stations 125 and 126. The belt extends around the underside of the guide pulleys and into chambers 136 and 138 for engagement with drive drums 140 and 142, respectively, in the manner described above relative to belt 56. An elongated rail 151 having a height approximately equal to the thickness of conveyor belt 150 closely parallels the outer edges of the belt to prevent foreign objects and passengers' feet from getting caught between supporting surface 124 and the reverse surface of the belt. An upright bladelike doctor bar 154, preferably having approximately the same width as the guide pulleys, is mounted beneath each guide pulley. The doctor bars are preferably located in close proximity to the upper tread surface of conveyor belt 150 as it contacts the adjacent guide pulley, thereby providing a relatively small, slitlike clearance between the upper edges of each doctor bar and the underside of the guide pulley. The doctor bars prevent foreign objects from entering the terminal chambers and jamming the conveyor drive mechanism. Because the doctor bars are located below the belt guide pulley, they present no safety hazard to persons using the system because, before a person can come in contact with the bar, he has alighted from the transport belt.

A step 155 is located at each end of the conveyor system adjacent the front of each guide pulley to assist passengers in boarding and alighting from the conveyor. As a further means of assistance for passengers, a moving handrail structure 156 parallels the inner longitudinal edges of belt runs 150a and 150b. The handrail structure preferably includes a plurality of upright, spaced-apart stanchions 158 disposed along the inner edges of the belt runs. An elongate, transversely arcuate, upper handrail belt support 160 is carried by the upper ends of the stanchions and extends parallel to surface 124 for supporting a flexible handrail belt 162 along the length of the conveyor system.

Other handrail support means, such as a vertically oriented, longitudinal wall, may be used if desired. Preferably, the handrail has a circular cross-sectional configuration and is driven by a drive pulley 164 located between belt runs 150a and 150b at each end of the conveyor. As shown in FIG. 8, drive shafts 146 and 148 of belt drive drums 140 and 142 extend upwardly above arcuate support surface 124. Handrail drive pulleys 164 are secured to the upper ends of each drive shaft and are located just above waist level for an average adult. Handrail 162 is engaged with drive pulleys 164, and in use, the pulleys drive the handrail at the same speed as conveyor belt 150. Separate drive means for handrail 162, such as an upright rotary drive pulley at each end of the conveyor system, may be used if desired. It will be noted handrail belt 162 serves as a handrail for assisting people in two directions simultaneously.

I claim:
1. A transport system comprising:
 a. a rotary drum disposed at each of a pair of system terminal stations spaced along a surface over which passengers and the like are to be transported;
 b. a transport belt entrance and a transport belt exit guide pulley mounted on opposite sides of the drum at each transport station, the exit pulley at one station being substantially aligned with the entrance guide pulley at the other station and vice versa;
 c. an endless transport belt having an upper tread surface and a reverse surface, the belt being engaged with the drums and the guide pulleys so that the belt reverse surface engages the pulleys, so that the belt tread surface engages at least one of the drums around a substantial portion of the circumference thereof, and so that the belt defines two substantially parallel transport runs across the surface between the stations and has its tread surface disposed upwardly between the stations for support of passengers and the like; and
 d. means for rotating said one drum to drive the belt.

2. A transport system according to claim 1 wherein the guide pulleys have substantially horizontal axes of rotation.

3. A transport system according to claim 1 wherein the guide pulleys at each terminal station are substantially coaxially aligned.

4. A transport system according to claim 1 including a chamber below the surface at each terminal station, the guide pulleys being disposed in the upper part of the respective chambers and the corresponding drum being disposed below the guide pulleys in the chamber.

5. A transport system according to claim 4 wherein each drum is rotatable about an axis inclined toward the other drum.

6. A transport system according to claim 4 wherein each rotary drum is disposed toward the other terminal station from the guide pulleys associated therewith.

7. A transport system according to claim 1 wherein the surface across which the belt extends between the terminal stations is convex upwardly between the terminal stations.

8. A transport system comprising:
 a. a conveyor having an upper tread surface for passengers and movable along a longitudinal direction of travel;
 b. an upright rotatable drum adjacent the conveyor having an upright exterior surface which traverses the conveyor along a fixed line of travel at an angle substantially less than a right angle, the drum comprising an upper rotating section defining a substantially horizontal flexible handrail, an intermediate rotating section having a radius sufficient to traverse the conveyor, and a lower rotating foot section disposed proximate the conveyor and constructed of a flexible material adapted to provide a resilient contacting surface for the feet of passengers riding the conveyor; and
 c. means for moving the conveyor and for rotating the drum so that the portion of the drum exterior surface which traverses the conveyor has a component of movement parallel to the conveyor direction of travel.

9. A transport system according to claim 8 wherein the drum foot section is adapted to be driven at a greater speed than that of the upper and intermediate drum sections.

10. A transport system according to claim 8 wherein the upper and intermediate drum sections are adapted to be driven to have rim speeds greater than the lineal velocity of the conveyor.

11. A transport system according to claim 8 wherein the lower extent of the drum foot section has sufficient proximity to the conveyor tread surface to prevent objects carried by the conveyor from travelling under the terminal drum.

12. A transport system according to claim 8 wherein a substantial portion of the drum intermediate section has a diameter greater than that of the foot section.

13. A transport system comprising:
 a. a conveyor having an upper tread surface for passengers and movable along a longitudinal direction of travel;
 b. a first upright rotary drum adjacent to one edge of the conveyor;
 c. a second upright rotary drum spaced along the conveyor direction of travel from the first drum arranged to have its periphery disposed adjacent to the other edge of the conveyor;
 d. an endless belt engaging the drums to provide a movable upright barrier surface which traverses the conveyor along a fixed line of travel at an angle substantially less than a right angle;
 e. guard means disposed adjacent the upper edge of the upright belt for covering the space bounded by the upright belt;
 f. a flexible handrail secured to the upper edge of the upright belt;
 g. means for moving the conveyor and the belt so the belt surface has a component of movement parallel to the conveyor direction of travel.

14. A transport system according to claim 13 wherein the second drum substantially overlaps the terminal portion of the conveyor.

15. A transport system according to claim 13 wherein the bottom edge of the upright endless belt is in close proximity to the upper tread surface of the conveyor thereby to substantially prevent objects carried by the conveyor from travelling under the belt.

16. A transport system comprising:
 a. a first conveyor defining a first direction of conveyor travel;
 b. a second conveyor adjacent the first conveyor having a direction of travel opposed to that of the first conveyor; and
 c. means disposed vertically between the conveyors defining a movable upright barrier surface having a path of movement a portion of which traverses the first conveyor and has a component of movement in the first direction of conveyor travel and a second portion of which has a component of movement in the second conveyor's direction of travel, whereby the upright barrier surface urges approaching passengers to move laterally from the first conveyor while simultaneously assisting passengers onto the second conveyor.

17. A transport system according to claim 16 wherein the barrier surface is defined by an upright revolving drum disposed between the conveyors and having diameter at least equal to the width of the first conveyor and the distance between the conveyor and located so that its periphery is substantially tangent to that edge of the second conveyor which is adjacent to the first conveyor.

18. A transport system according to claim 16 wherein means defining the upright barrier surface comprises:
 a. a first upright rotary drum between the conveyors;
 b. a second upright rotary drum downstream of the first drum along the first direction of conveyor travel; and c. an endless belt engaging the drums so that one portion of the belt travels in a downstream direction with the first conveyor while traversing the first conveyor to urge passengers to move laterally from the first conveyor and so that the return path of the belt travels in a downstream direction with the second conveyor to assist passengers boarding the second conveyor.

19. A transport system according to claim 18 wherein the return path of the belt traverses the second conveyor.

20. A transport system including:
   a. a rotary drum disposed at each of a pair of system terminal stations spaced along a surface over which passengers and the like are to be transported;
   b. an endless transport belt having an upper tread surface engaged with at least one of the rotary drums around a substantial portion of the circumference thereof and a reverse surface;
   c. guide means cooperating with the belt at each terminal station and arranged relative to the respective rotary drum for guiding the belt so that between the stations the belt tread surface is disposed upwardly for receiving passengers and the like and so that the belt defines two transport runs across the surface between the stations; and
   d. means for rotating said one drum to drive the belt.

21. A transport system according to claim 20 in combination with apparatus for urging passengers riding one run of the belt to move laterally from the belt when approaching one terminal station and for assisting passengers alighting to the other run at the one station, said apparatus comprising means disposed between the belt runs at the one terminal station defining a movable barrier surface having a path of movement a portion of which traverses the one belt run and has a component of movement parallel to the line of movement of the one run and a second portion of which is adjacent the other run and has a component of movement parallel to the line of movement of the other belt run.

22. A transport system according to claim 20 wherein the guide means cooperate with the belt reverse surface.

23. A transport system according to claim 20 wherein the belt tread surface engages the drum at each terminal station.

24. A transport system according to claim 20 in which the conveyor belt tread surface engages each drum around a substantial portion of the circumference thereof.

25. A transport system according to claim 20 wherein the upper tread surface has a higher coefficient of friction than the reverse surface.

26. A transport system according to claim 20 including low-friction means cooperating between the belt and said interstation surface for supporting the belt between the terminal stations.

27. A transport system according to claim 26 wherein the low-friction means includes a layer of halogen-substituted hydrocarbon carried by one of the belt reverse surface and the interstation surface for engaging the other of said surfaces.

28. A transport system according to claim 27 wherein said layer is carried by the interstation surface.

29. A transport system according to claim 27 wherein said layer is carried by the belt.

30. A transport system according to claim 29 including a second layer of halogen-substituted hydrocarbon carried by the interstation surface for cooperation with the belt layer.

31. A transport system according to claim 20 wherein the belt runs between the terminal stations are spaced from each other and including:
   a. a substantially horizontally disposed handrail pulley disposed at each terminal station above the belt runs, the handrail pulleys being aligned along a line parallel to and centrally of the belt runs;
   b. a flexible handrail loop engaged between the handrail pulleys;
   c. means movably supporting the handrail loop between the handrail pulleys above the adjacent edges of the belt runs and a selected distance above the belt runs; and
   d. means for rotating at least one of the handrail pulleys to drive the handrail loop at substantially the same rate as the belt.

32. A transport system according to claim 31 wherein the handrail pulleys are disposed coaxially of the belt drums for rotation in response to operation of the means for rotating at least one of the drums.